US010796248B2

(12) United States Patent
Liu et al.

(10) Patent No.: US 10,796,248 B2
(45) Date of Patent: Oct. 6, 2020

(54) RIDE-SHARING JOINT RENTAL GROUPS

(71) Applicant: Ford Global Technologies, LLC, Dearborn, MI (US)

(72) Inventors: Yimin Liu, Ann Arbor, MI (US); Perry Robinson MacNeille, Lathrup Village, MI (US); Jinjing Yang, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1347 days.

(21) Appl. No.: 14/699,291

(22) Filed: Apr. 29, 2015

(65) Prior Publication Data
US 2016/0321566 A1  Nov. 3, 2016

(51) Int. Cl.
*G06Q 10/02* (2012.01)
*G01C 21/34* (2006.01)
(Continued)

(52) U.S. Cl.
CPC .......... *G06Q 10/02* (2013.01); *B64C 39/024* (2013.01); *G01C 21/3423* (2013.01);
(Continued)

(58) Field of Classification Search
CPC ..................................................... G06Q 10/02
(Continued)

(56) References Cited

U.S. PATENT DOCUMENTS 5,790,974 A   8/1998  Tognazzini
6,615,130 B2  9/2003  Myr
(Continued)

FOREIGN PATENT DOCUMENTS

DE   102010003610 A1   10/2011
JP   2009211526 A       9/2009
WO   2014158289 A2     10/2014

OTHER PUBLICATIONS

Car-sharing concept blossoms: Prince George Citizen; Prince George, B.C. Nov. 2, 2007: 42.*
(Continued)

*Primary Examiner* — Nathan C Uber
*Assistant Examiner* — Fawaad Haider
(74) *Attorney, Agent, or Firm* — Franklin A. MacKenzie; Brooks Kushman P.C.

(57) ABSTRACT

A ride-sharing server may receive, from a user, a vehicle-rental request including trip characteristics specifying an origin location, a destination location, and time constraints; identify another user having rental criteria matching that of the vehicle-rental request; send a rent-share request to the user and the other user to rent-share as a joint-rental group; and rent a vehicle to the joint-rental group when the rent-share request is confirmed. A mobile device of a ride-sharing user may send, to a rent-sharing server, a vehicle-rental request including trip characteristics specifying an origin location, a destination location, and time constraints; receive, from the rent-sharing server, a rent-share request to rent-share a vehicle as a joint-rental group including another user having rental criteria matching that of the vehicle-rental request; and responsive to the rent-share request, rent the vehicle as the joint-rental group.

17 Claims, 9 Drawing Sheets

(51) Int. Cl.

| | | |
|---|---|---|
| *G06Q 50/00* | (2012.01) | |
| *G06Q 50/14* | (2012.01) | |
| *G06Q 30/06* | (2012.01) | |
| *G06Q 40/08* | (2012.01) | |
| *B64C 39/02* | (2006.01) | |
| *G06Q 40/00* | (2012.01) | |
| *G05D 1/00* | (2006.01) | |
| *G06Q 10/08* | (2012.01) | |

(52) U.S. Cl.
CPC ....... *G01C 21/3438* (2013.01); *G05D 1/0011* (2013.01); *G05D 1/0022* (2013.01); *G05D 1/0088* (2013.01); *G06Q 10/087* (2013.01); *G06Q 30/0631* (2013.01); *G06Q 30/0641* (2013.01); *G06Q 40/08* (2013.01); *G06Q 40/12* (2013.12); *G06Q 50/01* (2013.01); *G06Q 50/14* (2013.01)

(58) Field of Classification Search
USPC .................................................. 705/5
See application file for complete search history.

(56) References Cited

U.S. PATENT DOCUMENTS

| | | |
|---|---|---|
| 6,650,902 B1 | 11/2003 | Richton |
| 7,869,941 B2 | 1/2011 | Coughlin et al. |
| 8,073,614 B2 | 12/2011 | Coughlin et al. |
| 8,352,175 B2 | 1/2013 | Bauchot |
| 8,400,332 B2 | 3/2013 | Szwabowski et al. |
| 8,688,378 B2 | 4/2014 | McCall et al. |
| 8,688,532 B2 | 4/2014 | Khunger et al. |
| 8,762,049 B2 | 6/2014 | Feng |
| 8,949,028 B1 | 2/2015 | Klampfl et al. |
| 9,080,876 B2 | 7/2015 | Denicola |
| 9,261,374 B2 | 2/2016 | Mundinger et al. |
| 9,367,217 B2 | 6/2016 | Moore, Jr. |
| 9,377,319 B2 | 6/2016 | San Filippo et al. |
| 9,404,760 B2 | 8/2016 | Illoa Paredes |
| 9,488,487 B2 | 11/2016 | Anderson |
| 9,557,187 B2 | 1/2017 | Schuurbiers et al. |
| 2005/0021225 A1 | 1/2005 | Kantarjiev et al. |
| 2005/0065711 A1 | 3/2005 | Dahlgren et al. |
| 2005/0096946 A1 | 5/2005 | Janakiraman et al. |
| 2006/0173841 A1 | 8/2006 | Bill |
| 2006/0265256 A1 | 11/2006 | Galperin et al. |
| 2007/0010942 A1 | 1/2007 | Bill |
| 2007/0276595 A1 | 11/2007 | Lewinson et al. |
| 2007/0293958 A1 | 12/2007 | Stehle et al. |
| 2008/0005055 A1 | 1/2008 | Horvitz |
| 2008/0045234 A1 | 2/2008 | Reed |
| 2008/0133131 A1 | 6/2008 | Poreda et al. |
| 2008/0167937 A1 | 7/2008 | Coughlin et al. |
| 2009/0049044 A1 | 2/2009 | Mitchell |
| 2009/0198505 A1 | 8/2009 | Gipps et al. |
| 2009/0216600 A1 | 8/2009 | Hill |
| 2010/0191454 A1 | 7/2010 | Shirai et al. |
| 2010/0207812 A1 | 8/2010 | Demirdjian et al. |
| 2010/0228574 A1 | 9/2010 | Mundinger et al. |
| 2010/0305984 A1 | 12/2010 | Ben-Yitschak et al. |
| 2011/0077860 A1 | 3/2011 | Coughlin et al. |
| 2011/0087426 A1 | 4/2011 | Feng |
| 2011/0130958 A1 | 6/2011 | Stahl et al. |
| 2011/0218697 A1 | 9/2011 | Goldberg |
| 2012/0101809 A1 | 4/2012 | Kennewick et al. |
| 2013/0054139 A1 | 2/2013 | Bodin et al. |
| 2013/0054281 A1 | 2/2013 | Thakkar et al. |
| 2013/0117057 A1 | 5/2013 | Van Moltke et al. |
| 2013/0179067 A1 | 7/2013 | Trowbridge et al. |
| 2013/0345961 A1 | 12/2013 | Leader et al. |
| 2014/0012498 A1 | 1/2014 | Gustafson et al. |
| 2014/0047024 A1 | 2/2014 | Karamchedu |
| 2014/0067254 A1 | 3/2014 | Berlingerio et al. |
| 2014/0088871 A1 | 3/2014 | Gueziec |
| 2014/0142834 A1 | 5/2014 | Maitra et al. |
| 2014/0172727 A1 | 6/2014 | Abhyanker et al. |
| 2014/0188788 A1 | 7/2014 | Bridgen et al. |
| 2014/0278071 A1 | 9/2014 | San Filippo et al. |
| 2014/0278086 A1 | 9/2014 | San Filippo et al. |
| 2014/0278616 A1 | 9/2014 | Stone et al. |
| 2014/0330513 A1 | 11/2014 | Fratti et al. |
| 2014/0350979 A1 | 11/2014 | Paetzold et al. |
| 2014/0365107 A1 | 12/2014 | Dutta et al. |
| 2014/0372022 A1 | 12/2014 | Witmer |
| 2015/0057837 A1 | 2/2015 | Moore, Jr. |
| 2015/0206267 A1 | 7/2015 | Khanna et al. |
| 2015/0279216 A1 | 10/2015 | Ghanma |
| 2015/0317568 A1 | 11/2015 | Grasso et al. |
| 2016/0003637 A1 | 1/2016 | Anderson |
| 2016/0007912 A1 | 1/2016 | Hu et al. |
| 2016/0033283 A1 | 2/2016 | Ulloa Paredes |
| 2016/0048777 A1 | 2/2016 | Kitagawa et al. |
| 2016/0231129 A1 | 8/2016 | Erez et al. |
| 2016/0239024 A1 | 8/2016 | Fletcher et al. |
| 2016/0292596 A1 | 10/2016 | Gaitan et al. |
| 2016/0334235 A1 | 11/2016 | Gustafson et al. |

OTHER PUBLICATIONS

Dalton, "Now There's a Startup for Renting Cars to Uber and Lyft Drivers," Mar. 31, 2014, Gothamist LLC., http://sfist.com/2014/03/31/now_theres_a_startup_for_renting_ca.php.

* cited by examiner

US 10,796,248 B2

RIDE-SHARING JOINT RENTAL GROUPS

TECHNICAL FIELD

Aspects of the disclosure generally relate to a multi-modal transportation system allowing for trip planning, bidding, displaying, and trip reservation, including joint-rental groups.

BACKGROUND

A multi-modal transportation system is a system in which goods or passengers may be transported using multiple modes of transportation. These modes of transportation may include, as some examples, buses, trains, airplanes, cars, bicycles, boats (e.g., ferries, cruise lines, etc.) and even walking, and may include travel over paths such as roads, rails, monorails, tunnels, water, and air. Multi-modal transportation systems may foster competition between transportation modes such as between mass transit, multi-individual transit, and individual transit. Which transportation mode becomes dominant may depend on cultural, financial, geographic, occupant, and resource constraints. Many urban areas include multi-modal transportation systems including a hybrid of mass and individual transit systems interconnected at transportation hubs.

SUMMARY

In a first illustrative embodiment, a system includes a ride-sharing server configured to receive, from a user, a vehicle rental request including trip characteristics specifying an origin location, a destination location, and time constraints; identify another user having rental criteria matching that of the user request; send a rent-share request to the user and the other user to rent-share as a joint-rental group; and rent a vehicle to the joint-rental group when the rent-share request is confirmed.

In a second illustrative embodiment, a computer-implemented method includes identifying a vehicle matching passenger characteristics of first and second users having matching rental criteria; sending a rent-share request including a confirmation identifier to the first and second users to rent-share as a joint-rental group using the vehicle; and renting the vehicle to the joint-rental group when the rent-share request is confirmed by receipt of the confirmation identifier from the vehicle.

In a third illustrative embodiment, a system includes a mobile device of a ride-sharing user configured to send, to a rent-sharing server, a vehicle-rental request including trip characteristics specifying an origin location, a destination location, and time constraints; receive, from the rent-sharing server, a rent-share request to rent-share a vehicle as a joint-rental group including another user having rental criteria matching that of the vehicle-rental request; and responsive to the rent-share request, rent the vehicle as the joint-rental group.

DETAILED DESCRIPTION

Figure 1:
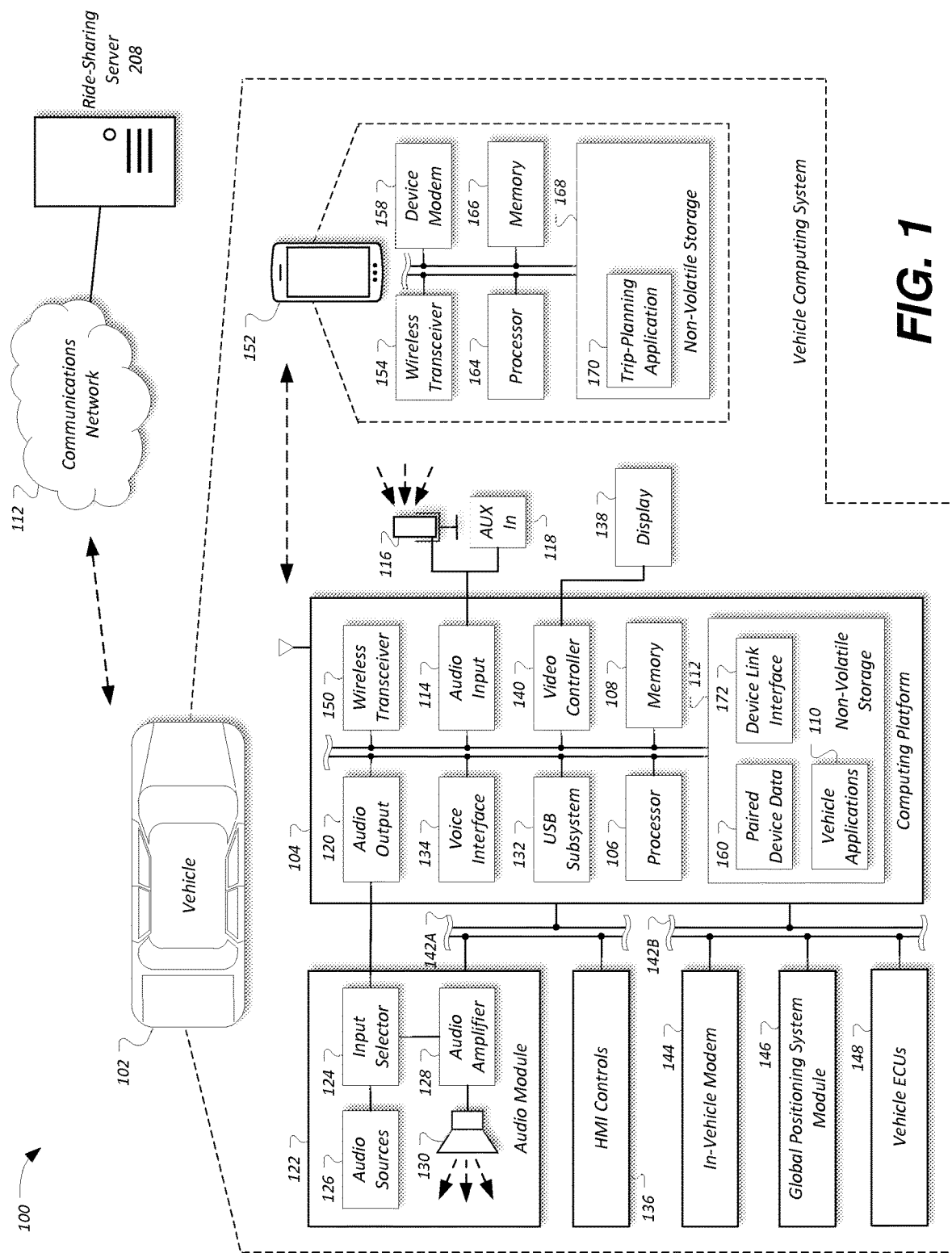
FIG. 1 illustrates an example diagram including a vehicle configured to access telematics servers and a mobile device having a trip-planning application.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A multi-modal transportation system may be a system in which goods or passengers may be transported using multiple modes of transportation, such as on foot, bicycles, motorcycles, cars, buses, aircraft, watercraft and railroad trains, that are owned or leased by the traveler, or part of an ownership group the partner belongs to or are available for rent or hire. The multi-modal transportation system may include strings of multi-modal hubs connected, for example, by a rail-based mass transit system or a bus-based rapid transit system. The hubs may include features such as parking lots and rental lots, with the rental lot including storage for vehicles such as cars, motorcycles and bicycles. Around each hub may be roads, bicycle lanes and walkways so commuters may travel between hubs or to and from hubs and destinations using bicycles, rental cars or walking. In many cases, at least some of the modes of transportation operate on paths dedicated to that mode of transportation.

A ride-sharing system may include a trip-planning application installed to user's mobile devices. When the user's mobile device is within wireless transmission range of a vehicle, the trip-planning application may be configured to connect to and integrate with an in-vehicle computing platform of the vehicle. The trip-planning application may be configured to perform route optimization in accordance with information received from the connected vehicle, such as global positioning information. The trip-planning application may be configured to facilitate ride-sharing decision-making by taking into account the status of vehicle routes across the modes of transportation, and differences among costs, time, and other factors, such as the riders' characteristics, route policy (e.g., carpool lane, parking, speed limits, vehicle weight and size), and the number of vehicle occupants. Ride-sharing drivers using the trip-planning application may accordingly understand trade-offs among those factors, and make selections based on the recommendations (e.g., using the human-machine interface (HMI) of the vehicle, using the HMI of the user's mobile device, etc.). When out-of-range of a vehicle, the trip-planning application may be configured to operate autonomously, without integration with the vehicle HMI.

In some cases, multiple users may wish to rent or use a vehicle together. In an example, users traveling together may rent a vehicle together to reduce the cost of travel to reach a common destination. However, a user traveling alone may also desire to share costs with other users. To do so, the user may utilize the trip-planning application to specify information to the ride-sharing system, such as location, maximum costs, as well as other trip requirements. Based on the information, the ride-sharing system may be configured to suggest joint rentals or use of the vehicles. When suggesting the joint rental groups, the ride-sharing system may further provide an assigned start time, a recommended route or routes, and drop off locations and times for the users.

As another possibility, the ride-sharing system may facilitate perpetual vehicle rental (e.g., rental by the hour), matching available vehicles with dynamically-sized rental groups. The matching may be performed such that sufficient vehicles are available when rentals are requested. The ride-sharing system may be further configured to resize the rental groups and re-assign the vehicles as user-specified constraints and vehicle availability shifts.

It should be noted that many examples herein describe ride-sharing of vehicles and ride-sharing groups. However, it should be noted that the ride-sharing system may also be utilized for time-sharing of vehicle rentals as well, where a vehicle is rented to a groups of users for the users to use at different times within the overall vehicle rental. For instance, in a time-share group a first user may utilize a vehicle for a first period of time, and a second user may utilize the same vehicle for a second period of time after the first period of time.

This application is related to commonly-assigned application Ser. No. 14/699,217, filed concurrently herewith and titled "RIDE-SHARING USER PATH DISTURBANCES AND USER RE-ROUTING"; Ser. No. 14/699,226, filed concurrently herewith and titled "RIDE-SHARING RANGE CONTOURS"; Ser. No. 14/699,241, filed concurrently herewith and titled "RIDE-SHARING ROUTING USING CONTEXTUAL CONSTRAINTS"; and Ser. No. 14/699,268, filed concurrently herewith and titled "RIDE-SHARING LONG-TERM RIDE-SHARE GROUPS", each of which is incorporated in its entirety herein by reference.

FIG. 1 illustrates an example system 100 including a vehicle 102 configured to access telematics servers and a mobile device 152 having a trip-planning application 170. The vehicle 102 may include various types of passenger vehicles, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the vehicle 102 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. An example spoken dialog system is described in U.S. Pat. No. 8,400,332, which is incorporated in its entirety by reference herein. The voice interface 134 may support speech recognition from audio received via the microphone 116 according to grammar associated with available commands, and voice prompt generation for output via the audio module 122. Different decoding speech strategies may be used, such as, phonetic, isolated word, word spotting, phrase recognition, large vocabulary continuous speech (LVCSR), etc. In some examples, different grammar languages and speech recognition engines may be utilized for the different strategies. The voice interface 134 may utilize probabilistic speech recognition techniques using the grammar in comparison to the input speech. In many cases, the voice interface 134 may include a standard user profile tuning for use by the speech recognition functions to allow the speech recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the computing platform 104 and another audio source 126 is selected for playback.

In some examples, a push-to-talk button may be configured to cause voice interface 134 to begin speech recognition. In another example, an "Open Mic" feature may be implemented where the user simply begins to speak without pressing a button. This may be implemented with a voice operated switch (VOX) or with an advanced LVCSR engine that activates for a predetermined set of phrases or words (e.g., a name of the system followed by please, followed by one of a specific set of verbs). The voice interface 134 may also support barge-in, whereby the speech synthesizer begins to provide a prompt before the user has finished the sentence (which is typical of natural speech where a listener begins to speak as soon as they understand the sentence, but before it is completed). Barge-in may also allow a dialog system to intentionally initiate a dialog during moments of silence, or to interrupt and ongoing conversation. This may be used as a tactic for conveying urgency, thus getting the user's attention.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to incorporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, wearable devices, E-textiles or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention. In some vehicles 102, the computing platform 104 wireless transceiver 154 may be configured to provide hotspot functionality to user's mobile devices 152. In some examples, based on the information regarding when users were paired to vehicles 102, the occupants' travel pattern may be recorded, and matched with other passengers in the future to provide suggestions for future joint rental.

When a mobile device 152 that supports network connectivity is paired with the computing platform 104, the mobile device 152 may allow the computing platform 104 to use the network connectivity of the device modem 158 to communicate over the communications network 156 with the remote telematics server 162 or other remote computing device. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the wireless transceiver 154 and with the remote telematics server 162 or other network services via the device modem 158. The computing platform 104 may also include a device link interface 172 to facilitate the integration of functionality of the mobile applications into the grammar of commands available via the voice interface 134. The device link interface 172 may also provide the mobile applications with access to vehicle information available to the computing platform 104 via the in-vehicle networks 142. An example of a device link interface 172 may be the SYNC APPLINK component of the SYNC system provided by The Ford Motor Company of Dearborn, Mich.

A trip-planning application 170 may be an example of an application installed to the mobile device 152 and configured to utilize the device link interface 172 to interact with the computing platform 104. When connected to the vehicle 102, the trip-planning application 170 may be configured to utilize information from vehicle sensors, actuators and electronic control units made available via the vehicle bus 142. The trip-planning application 170 may also be configured to operate when untethered from the vehicle 102, such as when the user is riding public transportation or walking. The trip-planning application 170 may be further configured to communicate with servers via the communications network 156, as discussed in detail below. The user may interact with the trip-planning application 170 through the HMI of the mobile device 152, via a web interface, or via the HMI of the vehicle 102, to avoid distraction while driving.

Figure 2A:
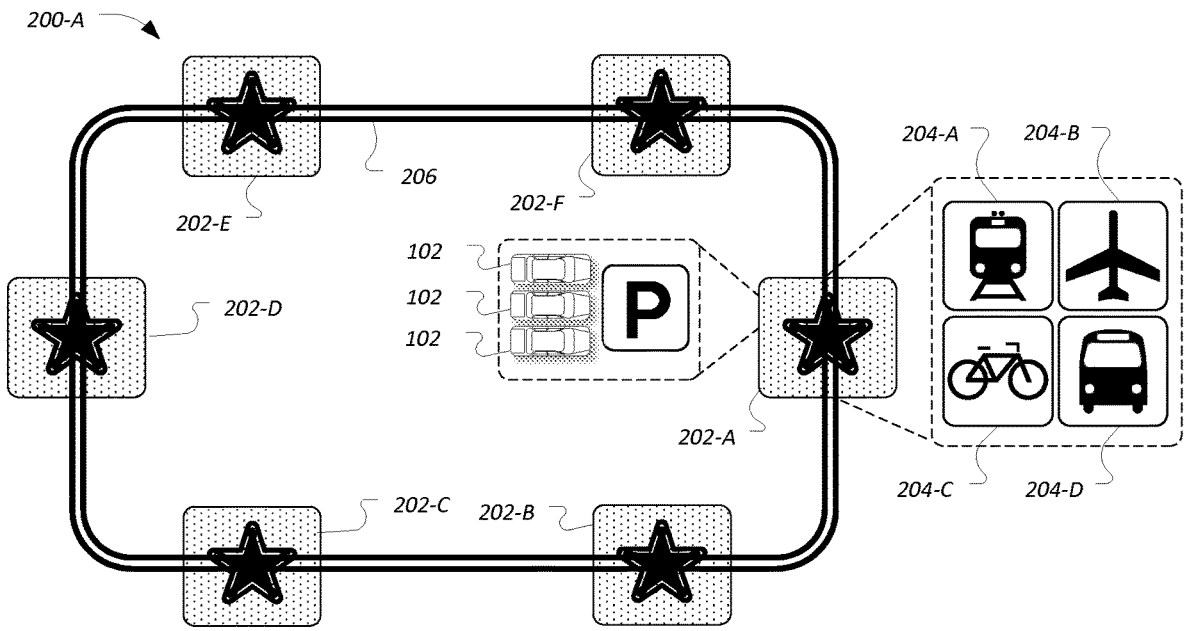
FIG. 2A illustrates an example logical diagram of a multi-modal transportation system.

FIG. 2A illustrates an example logical diagram of a multi-modal transportation system 200. As shown, the multi-modal transportation system 200 may include multi-modal hubs 202-A through 202-F (collectively 202). The multi-modal hubs 202 may be connected by mass transportation systems 204, such as one or more of a rail-based mass transportation system (e.g., trains 204-A), an air-based mass transportation system (e.g., airplanes 204-B), a road-based transportation system (e.g., bicycles 204-C, buses 204-D, etc.), and a water-based transportation system (not pictured). The system 200 may include vehicles 102 such as cars, trucks, bicycles, train cars, or other transportation vehicles or devices, which may traverse paths 206 to facilitate the movement of users from location to location.

The hubs 202 may be configured to make the transportation systems 204 available to users of the system 200. The transportation systems 204 may include, as some possibilities, ride-sharing services, vehicle rental services, and bike rental services. These services may include a car sharing service such as the Zipcar subsidiary of Avis Budget Group of Cambridge, Mass., a bicycle sharing service such as the Hubway bicycle sharing system of Boston, Mass., a taxi service, or another service in which the vehicles 102 may rented or hired temporarily (e.g., using the mobile device 152) or utilized for a specific purpose or trip (e.g., a one-way trip). It should also be noted that in some cases the users may utilize their own vehicles 102. The hubs 202 may be configured to store vehicles 102 of the transportations systems 204, such as rented or hired vehicles 102 awaiting a rider. The hubs 202 may be configured to store vehicles 102 of individuals, typically by lease or ownership. In an example, the hubs 202 may include a parking lot or other storage for individual-owned transit vehicles 102 (e.g., cars, trucks, bicycles, etc.) and a rental lot or other storage for storage of rental transit vehicles 102 (e.g., cars, motorcycles, bicycles, etc.). The hubs 202 additionally or alternately may include one or more of storage for aircraft, trains, etc. that are often not individually owned or leased, but are owned or leased by a firm or public authority.

The hubs 202 may further be located within proximity to one or more routable paths 206 (such as roads, bicycle lanes and walkways), such that users may traverse the paths 206 to travel between hubs 202 or between hubs 202 and other destinations using the vehicles 102 or walking. In some cases, the paths 206 may be shared across modes of transportation (e.g., personal vehicles 102 and taxi vehicles 102), while in other cases, the paths 206 may differ according to transportation mode (e.g., trains and buses traverse different paths 206). An ordered set of paths 206 that may be traversed by a user to travel from one location to another may be referred to herein as a route 226 (discussed in more detail below). It should be noted that terminology may varies between surface, nautical and aeronautical navigation. For instance, automobile routing systems may refer to an origin, a set of maneuvers, and a destination. There may further be waypoints connected by legs between each maneuver. A maneuver may be an intersection and waypoints between maneuvers describe the shape of the roads. Selection of a route may be done sequentially, e.g., by eliminating the least acceptable routes and introducing additional selective criteria and removing more unacceptable routes until one route is selected. However, unexpected or unlikely events may occur and a previously unacceptable route becomes preferred. With dynamic routing the route selection may change while underway.

Figure 2B:
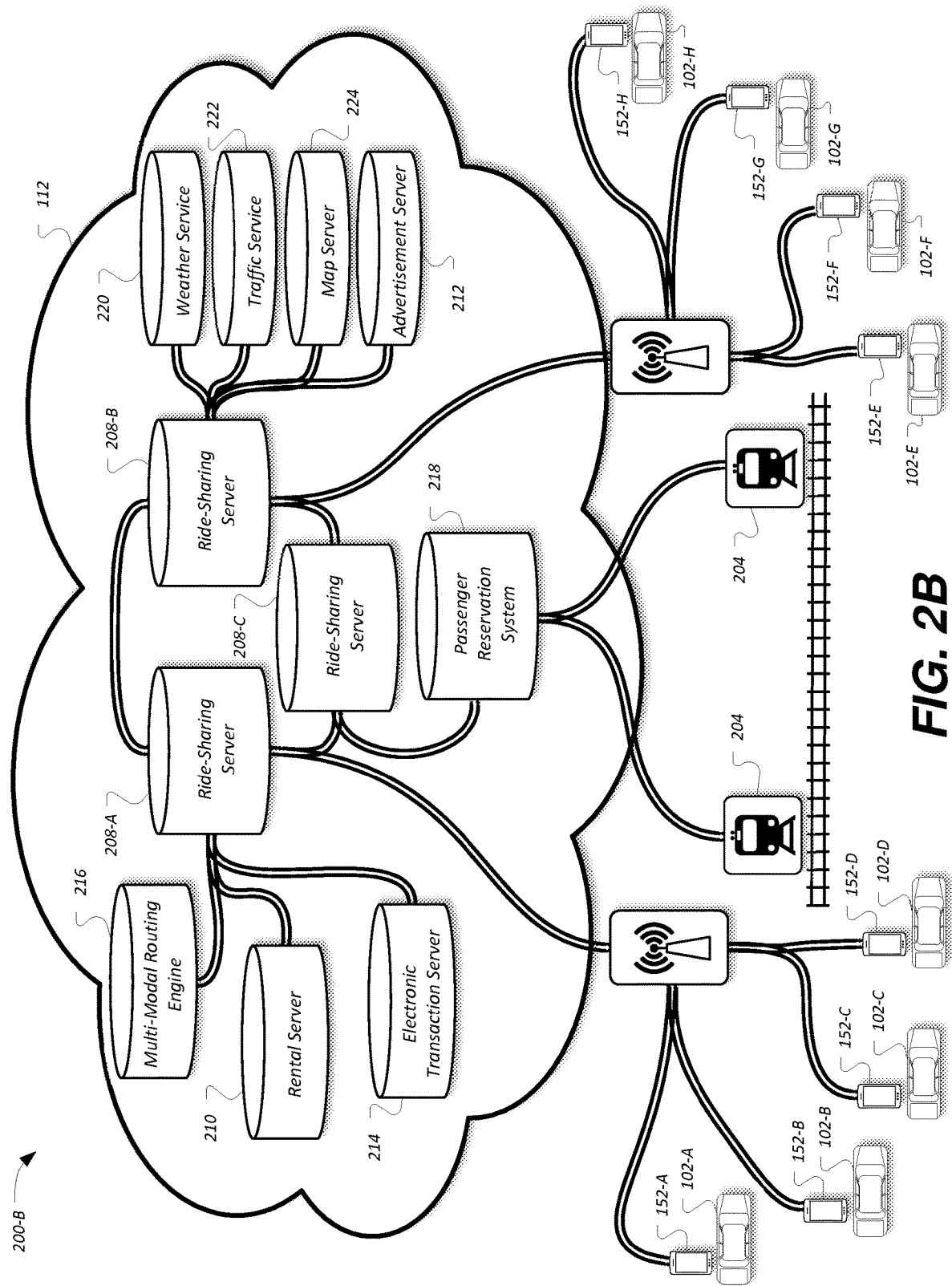
FIG. 2B illustrates an example network diagram of the multi-modal transportation system.

FIG. 2B illustrates an example network diagram 200-B of the multi-modal transportation system 200. As shown, the communications network 156 may support communication between various components, such as mobile devices 152 of the users (whether in riding in vehicles 102 or not), ride-sharing servers 208-A, 208-B, 208-C (collectively 208), a rental server 210, an advertisement server 212, a transaction server 214, a multi-modal routing engine 216, a passenger reservation system 218, a weather service 220, a traffic service 222, and a map server 224. The system 200 may take many different forms and includes multiple and/or alternate components and facilities. While an exemplary system 200 is shown in FIG. 2B, the exemplary components illustrated of the system 200 are not intended to be limiting. Indeed, additional or alternative components and/or implementations may be used. As one example, some or all of the functionality of the multi-modal routing engine 216 may be integrated into the ride-sharing server 208.

The ride-sharing servers 208 may be configured to manage the vehicles 102 of the system 200. As shown, the multi-modal transportation system 200 includes a plurality of vehicles 102-A through 102-H (collectively 102) configured to communicate with the ride-sharing servers 208 (e.g., with or without use of the mobile device 152). The ride-sharing servers 208 may be configured to serve as points of contact for the users of the trip-planning application 170 to interact with the services of the multi-modal transportation system 200. These services may include, as some possibilities, dynamic intermediate transportation mode options, planning of trips for ride-sharing passengers and drivers (e.g., instant ridesharing, dynamic ridesharing, ad-hoc ridesharing, dynamic carpooling, etc.), and vehicle 102 position tracking. The ride-sharing servers 208 may be accordingly provide ride-sharing services to users of the system 200, allowing them to efficiently car-pool either within a hub 202 or upon arrival at a hub 202. This may accordingly speed movement through the transportation hub 202 by automatically finding ride-share partners while traveling on the mass transportation system 204 rather than trying to do an ad-hoc ride-share in the transportation hub 202, e.g., hailing a taxi upon arrival at an airport.

The ride-sharing servers 208 may further provide services to parties other than the users of the trip-planning application 170. For instance, the ride-sharing servers 208 may provide notification to the transportation systems 204 when a particular mode of transportation is selected by a user, which allows for allocation of vehicles 102 to routes 226 for the users of the system 200. In another example, short-term rental vehicles 102 may be managed by a rental server 210. The short-term rental vehicles 102 or ride-sharing may be booked by the users via the rental server 210 and the details of the rental (e.g., cost, days rented, etc.) may be provided to the ride-sharing servers 208 for use in facilitating ride-sharing using the rented vehicle 102. For instance, the ride-sharing servers 208 may identify rented vehicles 102 or ride-sharing vehicles 102 to users that have arrived in a hub 202 by a mass transit transportation system 204 and are in need of a vehicle 102 to ride-share in to travel between the transportation hub 202 and a final destination.

The advertisement server 212 may be configured to aggregate information from transportation systems 204 to attract users and to offer special discounts in return for inconvenience such as changing a trip time, etc. The advertisement server 212 may be further configured to provide a revenue stream to operate the system 200, although the system 200 may additionally or alternatively use a subscription model to meet operational and fixed costs.

The transaction server 214 may be configured to operate as a wallet server to provide travelers with a way to purchase tickets, rent/hire vehicles 102, etc., from the user's mobile device 152. In an example, the transaction server 214 may be configured to manage account information for users of the system, to facilitate users making and receiving payment for sharing a vehicle 102, as well as to accumulate transactions over a billing cycle (e.g., 30 days, etc.), and provide a credit, disbursement, or bill to the user at the end of the billing cycle. Accordingly, the transaction server 214 may allow for financial aspects of the ride-sharing to be performed without cash or credit transactions being performed in the vehicles 102 or hubs 202, speeding movement through the transportation centers by avoiding stops at ticket counters, as an example.

As some other possibilities, the transaction server 214 may facilitate shared ownership of transportation assets such as vehicles 102 or seats on vehicles 102, for example, a group of users may collectively own a fleet of vehicles 102 according to a joint ownership agreement. The transaction server 214 may accordingly provide access to the shared transportation assets as determined by the joint ownership rules. Further, the transportation assets may be available to be leased, owned and shared to other users, e.g., to provide exclusive use of a seat to an individual or group in exchange for a down payment and a recurring fee. If a non-owner uses a seat that is available but owned by other users, the non-owner may pay the group who owns it for use of the seat. As another example, an employer may buy a seat for its employees. The seat may be assigned or at large, may be assigned to a specific class. If the class is full the user may be entitled to a coupon or some remuneration. The transaction server 214 may enables these ownership models, as well as facilitating accounting of payments between the users.

It should be noted that the fleet of vehicles 102 may be located in different hubs 202 or other geographic areas such as different cities. The owner users of the fleet of vehicles 102 may accordingly perform time-sharing of the vehicles 102, instead of or in addition to ride-sharing. In an example, when a user who is an owner in the fleet of vehicles 102 visits a different city (e.g., for a vacation or other trip), that user may be able to time-share a vehicle 102 in the destination city.

The multi-modal routing engine 216 may be configured to provide routing services to the ride-sharing servers 208. As discussed in detail below, the multi-modal routing engine 216 may be configured to identify travel times and paths 206 for a specific trip, as well as to identify and update routes 226 that may be affected by traffic disturbances or other travel issues, such as a vehicle 102 accident or a water main break. In some cases, the multi-modal routing engine 216 may be integrated into one or more of the ride-sharing servers 208, while in other cases some or all of the functionality of the multi-modal routing engine 216 may be separate from and callable by the ride-sharing servers 208.

The ride-sharing servers 208 may be further configured to communicate with other networked sources of information as well. In an example, the ride-sharing servers 208 may be configured to receive information from a passenger reservation system 218 of a transportation system 204, such as ticket information and train or other scheduling information. In another example, the ride-sharing servers 208 may be configured to receive information from a weather service 220 configured to provide information indicative of historical, current and/or forecast environmental conditions. In a further example, the ride-sharing servers 208 may be configured to receive information from a traffic service 222 configured to provide information indicative of historical, current and/or forecast traffic conditions along the paths 206. In yet a further example, the ride-sharing servers 208 may be configured to receive map information, such as path 206 information and route 226 information from the map server 224.

Figure 3:
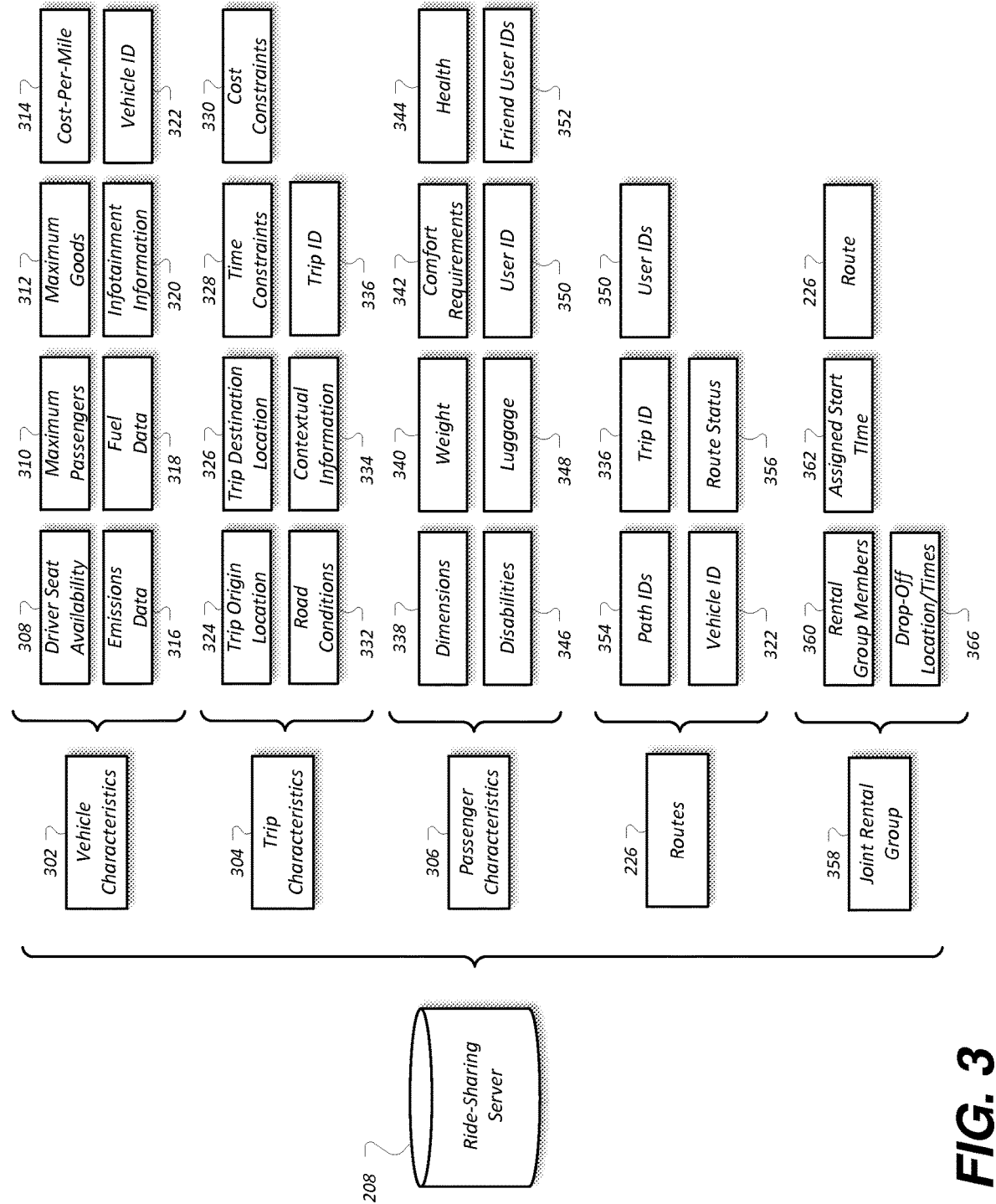
FIG. 3 illustrates an example data diagram of characteristics useful for the generation of a route.

FIG. 3 illustrates an example data diagram 300 of characteristics useful for the generation of a route 226. These characteristics may include, as some non-limiting categories, vehicle characteristics 302, trip characteristics 304, and passenger characteristics 306.

The vehicle characteristics 302 may include one or more characteristics of a vehicle 102. The vehicle characteristics 302 may include information indicative of a current status of the vehicle 102, as well as information indicative of the capabilities of the vehicle 102 itself, independent of any current status. As some examples, the vehicle characteristics 302 may include a driver seat availability 308 indicative of whether or not a user is allocated to the vehicle 102 (and if so, optionally an identifier of the user), a maximum number of passengers 310 that may be simultaneously transported using the vehicle 102 (e.g., a seat belt count, etc.), a maximum amount of goods 312 that may be transported by the vehicle 102 (e.g., maximum weight, length, measure of volume, etc.), a cost-per-mile for operation 314 of the vehicle 102 (e.g., fuel efficiency information, rental cost per mile information, etc.), emissions data 316 (e.g., cleanliness of operation of the vehicle 102), fuel data 318 (e.g., a measure of liquid fuel quantity and type or battery state of charge currently available), and infotainment information 320 (e.g., whether video, calling, connectivity, or other features are available). The vehicle characteristics 302 may further include a vehicle identifier 322 that may be used to reference the vehicle 102 (e.g., a manufacturer-assigned vehicle identification number (VIN), an identifier assigned by a rental server 210 to a rental vehicle 102, a random unique identifier, a secure entity ID (SEID), a public encryption key, encrypted passphrase etc.).

The trip characteristics 304 may include one or more characteristics of a user trip to be performed over the multi-modal transportation system 200. As some examples, the trip characteristics 304 may include information such as trip origin location 324 and trip destination location 326 (e.g., specified as GPS coordinates, addresses, etc.), time constraints 328 indicative of what times are desired or required for the trip to take place (e.g., a time of arrival to the destination, a time of departure based on a previous event such as arrival at a hub 202 due to a previous trip, etc.), cost constraints 330 (e.g., a maximum amount the user is willing to pay to make the trip), road conditions 332 (e.g., traffic, road closures, weather, visibility, etc.), and contextual information 334 (e.g., timing requirements such as to arrive at a movie showing). The trip characteristics 304 may further include a trip identifier 336 that may be used to reference the trip characteristics 304 (e.g., a random number, a numerically-increasing database key identifier, etc.).

In another example, the trip characteristics 304 may relate to a Level of Service (LOS) that is estimated using an LOS model. A routing algorithm may create a list of multi-modal routes 226 with LOS accounting for aspects such as optimal travel time, walking when weather is forecast to be fair, traveling with friends, etc. An individual travel demand model (TDM) may be applied to determine a ranking of each route 226 and a likelihood the traveler may wish to make the trip. For example, a traveler wishing to arrive to a job interview on-time would specify trip characteristics 304 to rank route options that arrive a little early for the interview much higher than those that arrive late. This driver preference may be expressed by the TDM which is used to rank routes 226, in this case with a high priority on arrival time. The TDM of a hungry traveler going home to dinner might prioritize short travel time, rather than arrival time as described in the example above, and may specify trip characteristics 304 accordingly. Individual TDM may accordingly be implanted as a context-aware learning system exemplified by recommender systems.

The passenger characteristics 306 may include one or more characteristics of a passenger desiring to make a trip. The passenger characteristics 306 may include trip-specific information for the passenger, and/or characteristics of the passenger that are independent of the particular trip. As some examples, the passenger characteristics 306 include passenger dimensions 338 (e.g., height, width, etc.), passenger weight 340 (e.g., kilograms), passenger comfort requirements 342 (e.g., heating/cooling settings, massaging seat settings, etc.), health information (e.g., whether the passenger is sick, prone to motion sickness, has special allergies such as pollen or tobacco, etc., requiring different routes or accommodations), disabilities information 346 (e.g., whether the passenger has impairments in movement or other characteristics that may affect travel), and luggage 348 (e.g., information regarding count, weight, and/or dimensions of luggage).

The passenger characteristics 306 may further include a user identifier 350 that may be used to reference the specific passenger (e.g., a random number, a numerically-increasing database key identifier, etc.). The passenger characteristics 306 may also include friend associations 352 indicating user identifiers 350 of other users of the system 200 considered to be friends of the user identified by the user identifier 350. For instance, a user may indicate friendship with other users of the system 200 with which may desire to consider ride-sharing for future routing.

As mentioned above, the routes 226 may include an ordered set of path identifiers 354 of paths 206 that may be traversed by a user to travel from one location to another. In an example, these paths 206 may be referenced by the route 226 as path identifiers 354. The route 226 may specify indications of the individual paths 206 to be traversed both to provide information to the vehicle 102 traversing the route, and also to provide indications of which routes 226 may be affected by disturbances or changes to travel conditions along the paths 206. The routes 226 may further include additional information, such as the trip identifier 336 of the trip characteristics 304 from which the route 226 was generated, user identifiers 350 of one or more users associated with the route 226 (e.g., scheduled to traverse the route 226, located within the vehicle 102 during traversal of the route 226, etc.), the vehicle identifier 322 of the vehicle 102 assigned to or otherwise associated with the route 226, and a route status 356 of the route. The route status 356 may include information such as whether the route 226 has been delayed, whether the route 226 is pending but not started, whether the route 226 is started, whether the route 226 is completed, whether the route 226 is completed successfully. The route status 356 may additionally or alternately include information regarding the status of the vehicle 102 itself, such as the current location of the vehicle 102.

In some ride-sharing situations, a driver user may not have a destination in mind, and may simply travel to pick up and drop off passengers to collect fares or to drive for pleasure (e.g., a "Sunday drive"). In other ride-sharing situations, a driver user may provide trip characteristics 304 to the ride ride-sharing server 208, and may receive a route 226 in accordance with the trip characteristics 304. In such an example, multiple users of the ride-sharing server 208 may request to travel from locations along the route 226 to destination locations further along the route 226, and the ride-sharing server 208 may recommend those other users to the driver to ride. In an example, such recommendations may be made using a recommender system such as that described in commonly-owned application U.S. Patent Publication No. 2011/0040707, titled "Intelligent music selection in vehicles," which is incorporated in its entirety herein by reference. The driver user may elect to share the route 226 by making modifications to the route 226 to picking up and dropping off other users in exchange for funds. These additional pickups and drop-offs may offset the cost incurred by the driver in traversing the route 226, but the route 226 itself may principally be defined by the driver user.

In yet further examples, the route 226 may be defined according to trip characteristics 304 of multiple users. In such an example, multiple users of the ride-sharing server 208 may request to travel from the trip origin location 324 to the trip destination location 326, and the ride-sharing server 208 may recommend other users to share a ride for a subset of the complete route 226 from the trip origin location 324 to the trip destination location 326. For instance, the ride-sharing server 208 may identify two or more user identifiers 350 of users who may be routed to an intermediate route 226 waypoint, and from that waypoint may ride-share to another waypoint or to the trip destination location 326 for one or more of the ride-sharing users. As a more specific example, two users may each arrive at a multi-modal hub 202 from separate trains, and may ride-share using a rental vehicle 102 from the multi-modal hub 202 to the trip destination location 326. In other cases, the ride-sharing users themselves may define the group of users to share a ride.

The joint rental group 358 may include a definition of an association of rent-sharing group members 360 to share a vehicle 102. In an example, the ride-sharing group members 360 may be indicated as references to one or more user identifiers 350 of the included ride-sharing users.

In some cases, multiple users may wish to rent or use a vehicle 102 together. In an example, the multiple users may wish to use the same vehicle 102 at the same time to reach a common destination or waypoint (ride-sharing the vehicle 102). In another example, the multiple users may wish to use the same vehicle 102 at different times (time-sharing the vehicle 102), rather than each renting their own vehicles 102. In yet a further example multiple users may wish to perform both time-sharing of the vehicle 102 and ride-sharing of the vehicle 102. Such users traveling together may utilize the trip-planning application 170 to create a joint rental group 358 with themselves as rental group members 360, such that they may request a vehicle 102 together to reach a common destination.

However, a user traveling alone may also desire to share costs with other users. To do so, the user may provide information about the intended usage of the desired vehicle 102, which may allow the ride-sharing server 208 to match the user together with other users having similar requirements. For instance, the user may utilize the trip-planning application 170 to specify the information to the ride-sharing server 208, such as the trip origin location 324 and trip destination location 326, maximum costs, as well as other trip requirements. Based on the information, the ride-sharing server 208 may be configured to identify potential joint rental groups 358 of potential rental group members 360 for combined use of a vehicle 102. When suggesting the joint rental groups 358, the ride-sharing server 208 may further provide an assigned start time 362, a recommended route 226 or routes 226, and drop off locations and times 366 for the rental group members 360. With respect to the recommended route 226, the route 226 may be generated to confirm with the trip characteristics 304 and passenger characteristics 306 of the rental group members 360.

Figure 4:
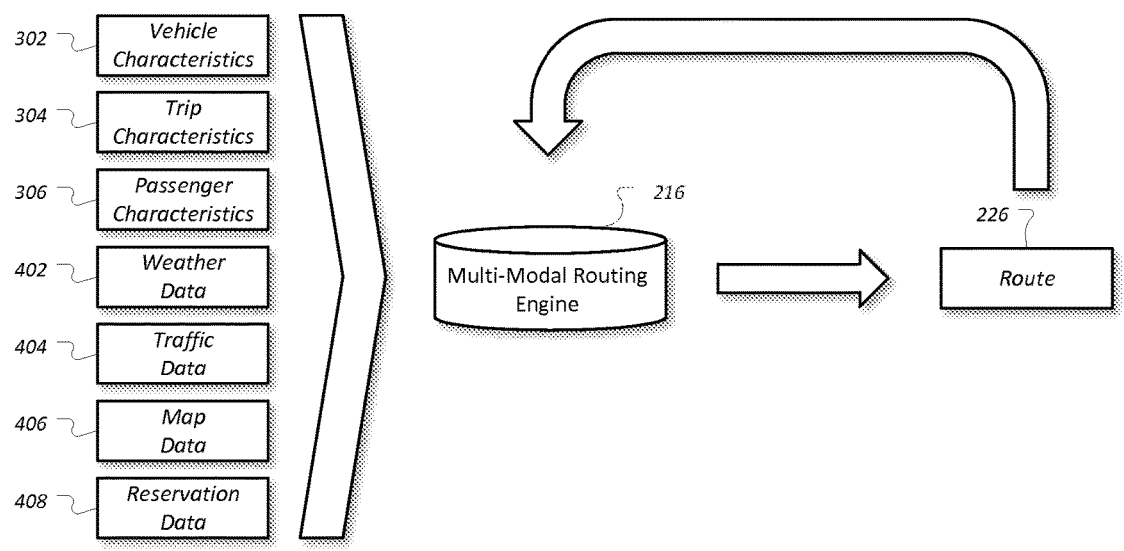
FIG. 4 illustrates an example data flow for constructing a route.

FIG. 4 illustrates an example data flow diagram 400 for constructing a route 226. As shown, the multi-mode routing engine 216 may receive the vehicle characteristics 302, the passenger characteristics 306, the trip characteristics 304, weather data 402 from the weather service 220, traffic data 404 from the traffic service 222, map data 406 from the map server 224, and reservation data 408 from the passenger reservation system 218. Using the received information, the multi-mode routing engine 216 may compute a route 226 including an ordered set of one or more paths 206 that may be traversed by a user.

The multi-mode routing engine 216 may be configured to identify time and cost values for various paths 206 through the multi-modal transportation system 200. In an example, the multi-mode routing engine 216 may receive map data 406 (e.g., that includes mass transit schedules, forecast arrival and departure times and actual departure and arrival times. For example, ferry schedule information may include path 206 lengths (e.g., meters) and/or path traversal cost information (e.g., estimated traffic-free travel times). The multi-mode routing engine 216 may be further configured to adjust these values in accordance with current conditions. For instance, the multi-mode routing engine 216 may utilize the weather data 402 to decrease estimated rates of travel (e.g., estimated km/hour over the paths 206 to account for account for rain, snow, ice, fog or other weather conditions. As another possibility, the multi-mode routing engine 216 may utilize the traffic data 404 to decrease estimated rates of travel over specific paths 206 identified as being slow or blocked (e.g., based on actual vehicle 102 travel time data measured from roadway loop sensors, cameras, etc.). As yet a further possibility, when a mass transportation mode is running under capacity, the multi-mode routing engine 216 may decrease costs for users traversing that system over another mode of transportation, while if the mass transportation mode is at capacity or above, the multi-mode routing engine 216 may increase costs for users traversing that system.

The multi-mode routing engine 216 may be further configured to utilize the determined path 206 values to construct one or more routes 226 from a trip origin location 324 to a trip destination location 326 that conform to the time constraints 328 and the cost constraints 330 of the trip characteristics 304. For example, the multi-mode routing engine 216 may utilize a least-cost routing algorithm to determine candidate routes 226 from the trip origin location 324 to a trip destination location 326, and then may discard those routes that do not confirm to the time constraints 328 and the cost constraints 330. In an example, the multi-mode routing engine 216 may prefer time constraints 328 over cost constraints 330 in cases where no route 226 meets both the time constraints 328 and the cost constraints 330. In another example, the multi-mode routing engine 216 may utilize information within the trip characteristics 304 or passenger characteristics 306 of the user requesting the route to determine whether to prefer time constraints 328 over cost constraints 330 or vice versa.

The identified routes 226 may accordingly be provided to the users. Moreover, the identified routes 226 may be maintained by the ride-sharing server 208 as well. When vehicles 102 are typically rented or trips are booked, users may typically not provide insight to the system 200 into the travel plans for the users across multiple modes of transportation. However, by storing the identified routes 226, the ride-sharing server 208 may be configured to perform operations in relation to the multiple modes of transportation that might be otherwise unavailable.

For instance, the multi-mode routing engine 216 may further utilize the route 226 and additionally-received information to provide updated routes 226 due to revised information. In an example, the multi-mode routing engine 216 may receive updated traffic data 404 indicating that one or more paths 206 of the route 226 have become blocked or slow. For instance, a water main break may close certain roads, which may require routes 226 constructed to traverse those paths 206 to be reformulated.

In another example, the multi-mode routing engine 216 may receive information indicating that a mass transit vehicle 102 (e.g., a train, bus, plane, etc.) is running behind schedule, e.g., from a mass transportation system 204. Therefore, as the user may arrive later than originally intended, the start time for the route 226 may require adjustment, invalidating some, or all, of the route 226. For example, a route 226 as previously determined may have intended for the user to ride a train that leaves at a particular time, and the new arrival time of the user would cause the user to miss the train. As another example, a route 226 as previously determined may still be valid, but may no longer allow for the user to reach the trip destination location 326 within the time constraints 328. As an even further example, a route 226 as previously determined may have counted on including a second rider to offset costs of renting the vehicle 102, and that secondary rider may be unavailable to ride-share if the driving user is late.

When information such as that in the above examples is received that may affect the route 226, the multi-mode routing engine 216 may be configured to re-determine the route 226, similar to as discussed above with respect to initial creation of the route 226. When the multi-mode routing engine 216 determines that the original route 226 is no longer possible, and a revised route 226 is indicated, the system 200 may be configured to inform the user of the revised route 226.

The determined route 226 may accordingly be associated with the joint rental group 358, for use in routing the rental group members 360.

Figure 5:
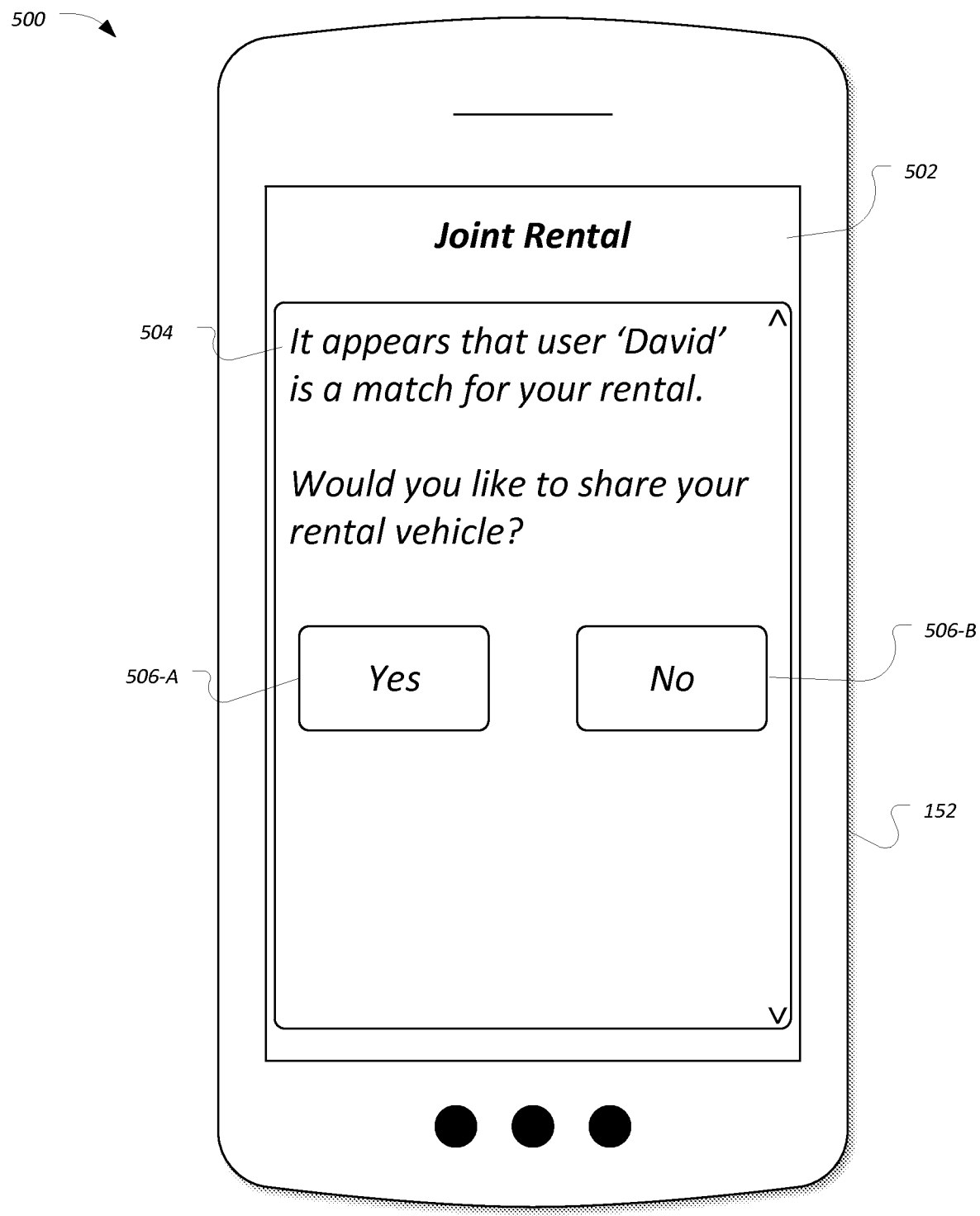
FIG. 5 illustrates an example user interface of the trip-planning application for proposing a joint rental group for a vehicle rental.

FIG. 5 illustrates an example user interface 500 of the trip-planning application 170 for proposing a joint rental group 358 for a vehicle 102 rental. As illustrated, the user interface 500 may be presented to the user trip-planning application 170 via a display of the mobile device 152. As another possibility, the user interface 500 may be provided to the user via a display of a paired vehicle 102.

The user interface 500 may be used to collect confirmations of rental group members 360 to join together in the joint rental group 358. In an example, the ride-sharing server 208 may send, based on a match of the trip characteristics 304 and vehicle characteristics 302 of the current user to other potential rental group members 360 also requesting a rental, a suggested rental group message to the trip-planning applications 170 of users suggested to be combined into a joint rental group 358. Thus, the ride-sharing server 208 may match the trip characteristics 304 and vehicle characteristics 302 to potential users to ride-share or to time-share vehicles 102. Based on the suggested rental group message, the users may utilize their mobile devices 152 to confirm or reject being a part of the joint rental group 358.

The user interface 500 may include a title label 502 to indicate to the user that the user interface 500 is for confirmation of rental group members 360 to join together in the joint rental group 358. The user interface 500 may further include label text indicating information such as an identifier of the rental group member(s) 360 to be joined with the current user (e.g., "David" in the illustrated example), as well as a request to have the user agree or disagree to participation in the suggested joint rental group 358. The user interface 500 may also include response controls 506 to receive the user confirmation. As one possibility, the user interface 500 may include a yes response control 506-A that, when selected by the user, informs the trip-planning application 170 that the rental group member 360 wishes to participate in the upcoming ride-share, and a no response control 506-B that, when selected by the user, informs the trip-planning application 170 that the rental group member 360 wishes to forego participation in the upcoming joint rental group 358.

Responsive to accepting or rejection inclusion in the upcoming joint rental group 358, the trip-planning application 170 may be configured to send the response to confirm or deny inclusion in the rent-sharing to the ride-sharing server 208 for processing. In some cases, the user interface 500 may visually indicate a default action to be performed when no response is provided via the response controls 506. For instance, the one of the response controls 506 defining the default may be drawn in a style indicative of a default action (e.g., with a dotted line surrounding the option, etc.). In many cases, the default may be to forego participation in the rent-sharing absent an affirmation by the user, but this setting may be defined differently in the passenger characteristics 306 for the user who may wish to always default to accepting any available rent-shares. The default setting may, e.g., be provided to the trip-planning application 170 in the suggested rental group message sent to the mobile device 152.

With the joint rental group 358 accepted or not, the user or joint rental group 358 of users may choose a vehicle 102 for the rental. In an example, the ride-sharing server 208 may inform the rental server 210 of the upcoming rent-share, may receive an indication of the vehicle 102 to be rented from the rental server 210, and may send the information to the trip-planning applications 170 of the users to allow the users to complete the initiation of the vehicle 102 rental. In another example, the ride-sharing system may facilitate perpetual vehicle rental (e.g., rental by the hour), matching available vehicles 102 with dynamically-sized joint rental groups 358. The matching of vehicles 102 to joint rental groups 358 may be performed such that sufficient vehicles 102 are available when rentals are requested. The ride-sharing server 208 may be further configured to resize the joint rental groups 358 and re-assign the vehicles 102 as user-specified constraints (e.g., trip characteristics 304, passenger characteristics 306, etc.) and vehicle 102 availability shift.

Figure 6:
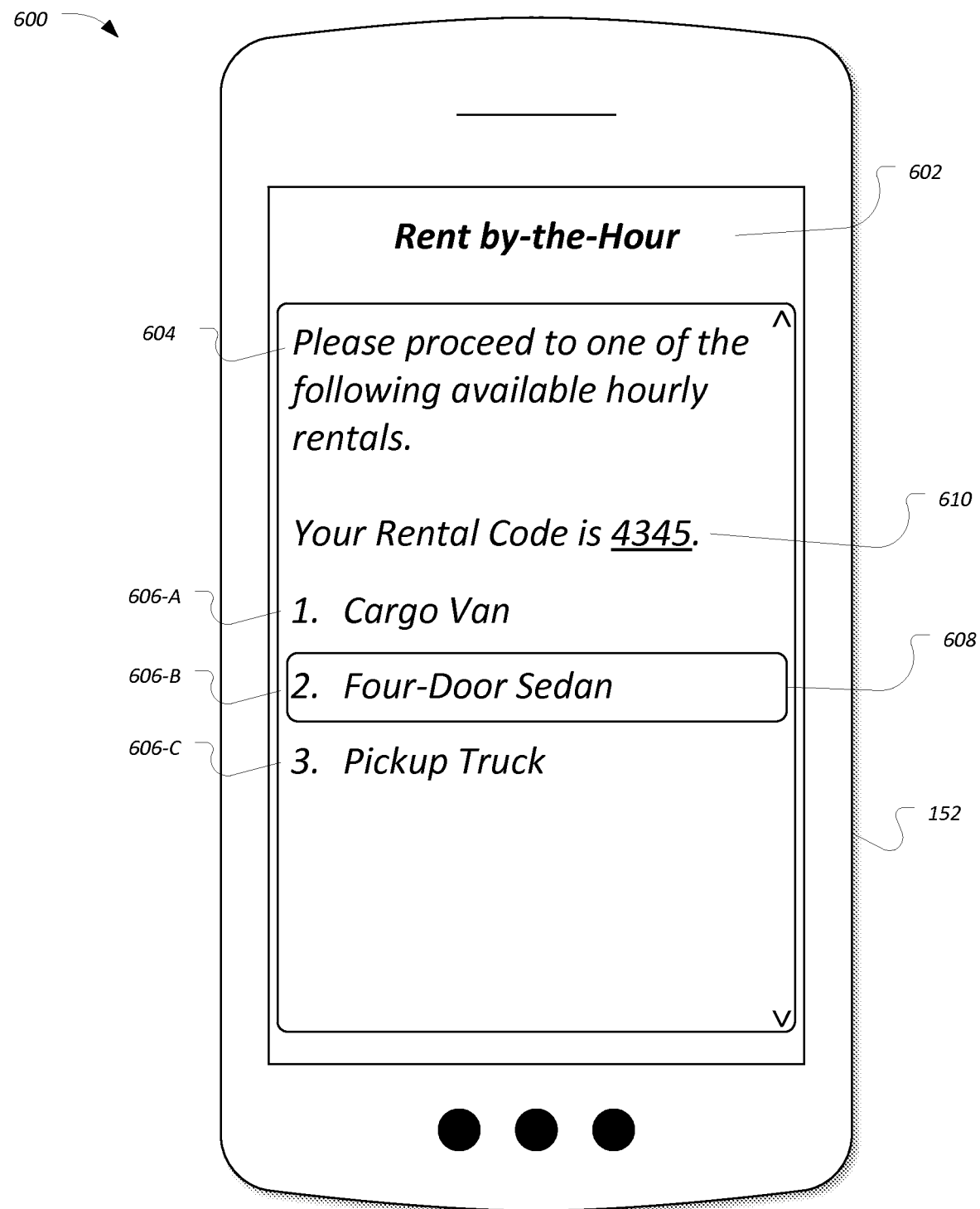
FIG. 6 illustrates an example user interface of the trip-planning application for facilitating the rental of a vehicle by-the-hour.

FIG. 6 illustrates an example user interface 600 of the trip-planning application 170 for facilitating the rental of a vehicle 102 by-the-hour. As with the user interface 500, the user interface 600 may be presented to the user trip-planning application 170 via a display of the mobile device 152 or a display of a paired vehicle 102. The user interface 600 may be presented to users, for example when an assigned start time 362 for a join rental group 358 is reached based on a listing of vehicle 102 information provided to the trip-planning application 170 by the ride-sharing server 208.

The user interface 600 may include a title label 602 to indicate to the user that the user interface 600 is for rental of a vehicle 102 by-the-hour. The user interface 600 may further include a list control 604 configured to display a listing of available vehicles 102 that may be selected for rental by the user of the trip-planning application 170. For instance, each of a set of vehicles 102 that meet the constraints of the joint rental groups 358 may be displayed as one of several selectable list entries 606. As illustrated, the list control 604 of the trip-planning application 170 includes an entry 506-A for a first vehicle 102 "Cargo Van" an entry 506-B for a second vehicle 102 "Four-Door Sedan," and an entry 506-C for a third vehicle 102 "Pickup Truck." It should be noted that the exact vehicles 102, number of vehicles 102, and vehicles 102 order is merely an example.

The list control 604 may operate as a menu, such that a user of the user interface 600 may be able to scroll through list entries of the list control 604 to adjust a currently selected list entry 608 (e.g., using up and down arrow buttons) as well as to invoke the currently selected list entry 608 (e.g., using a select button). In some cases, the list control 604 may be displayed on a touch screen display, such that the user may be able to touch the list control 604 to select and invoke a menu item. As another example, the user interface 600 may support voice command selection of the menu items. For example, to select to rent the "Four-Door Sedan" vehicle 102 for the joint rental group 358, the user may press a push-to-talk button or say a voice command initiation keyword, and may speak the voice command "select Four-Door Sedan" or "choose option 2."

Responsive to the user selection, the trip-planning application 170 may be configured to send the selection to the ride-sharing server 208. The ride-sharing server 208 may accordingly be configured to update the rental server 210 regarding which of the vehicles 102 is chosen for upcoming rental by the joint rental group 358. Also responsive to the selection, the trip-planning application 170 may provide directions to the current global positioning location of the vehicle 102, e.g., as received from the vehicle 102 via the rental server 210.

As a further aspect of the selection of vehicles 102 for use by the joint rental group 358, the user may be requested to provide a confirmation identifier 610 to the vehicle 102, such as a rental identification code number, to confirm that the vehicle 102 being picked up is, in fact, being utilized for the joint rental group 358. To facilitate the user entry of the confirmation identifier 610, the user interface 600 may be configured to illustrate the confirmation identifier 610. When the confirmation identifier 610 is entered into the vehicle 102, the rental may begin.

Figure 7:
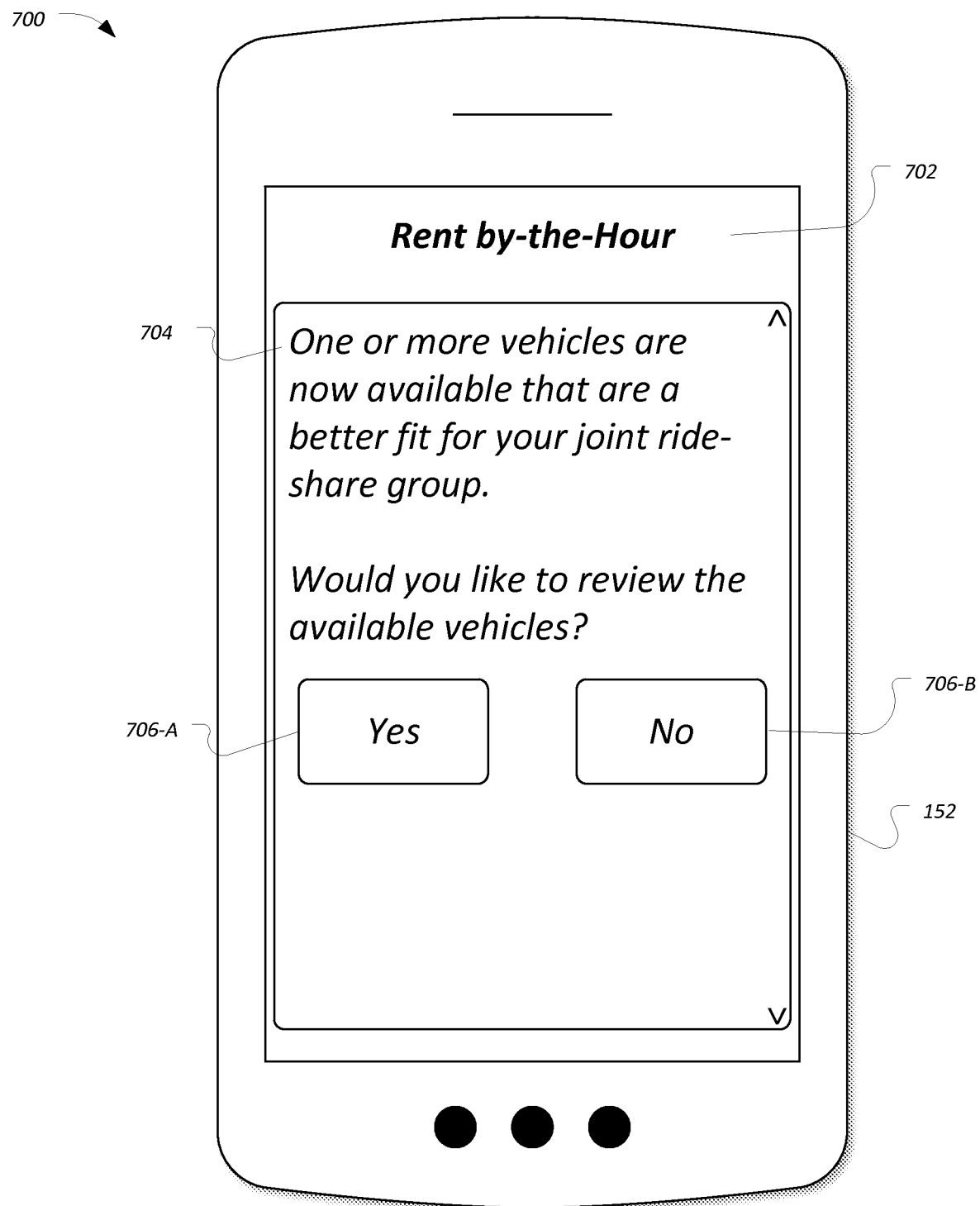
FIG. 7 illustrates an example user interface of the trip-planning application for informing a user of a replacement vehicle to use for the rental of a vehicle by-the-hour.

FIG. 7 illustrates an example user interface 700 of the trip-planning application 170 for informing a user of a replacement vehicle 102 to use for the rental of a vehicle 102 by-the-hour. As with the user interfaces 500 and 600, the user interface 700 may be presented to the user trip-planning application 170 via a display of the mobile device 152 or a display of a paired vehicle 102. The user interface 700 may be presented to users, for example responsive to receiving a message from the ride-sharing server 208 indicating that other vehicles 102 are available for use for the joint rental group 358.

For instance, the ride-sharing server 208 may facilitate a perpetual vehicle 102 rental with a dynamically-sized joint rental group 358. As users leave the rental vehicle 102 (e.g., get off at their stops), needs for the size of the vehicle 102 may be reduced. Or, as users add to the joint rental groups 358 (e.g., get in at their stops), needs for the size of the vehicle 102 to be rented may be increased. As another possibility, due to vehicle 102 availability when the joint rental group 358 was initiated, a relatively large vehicle 102 was chosen due to lack of availability of a smaller vehicle 102 which became available. Thus, the ride-sharing server 208 may be configured to resize the joint rental group 358 and re-assign the vehicles 102 as user-specified constraints and vehicle 102 availability shifts. Based on the determination of an update to the user-specified constraints or vehicle 102 availability, the users may utilize their mobile devices 152 to confirm or reject making a change in the currently-rented vehicle 102.

The user interface 700 may include a title label 702 to indicate to the user that the user interface 700 is for confirmations of updating the vehicle 102 associated with the joint rental group 358. The user interface 700 may further include label text indicating that other vehicles 102 are available for selection, as well as a request to have the user agree or disagree to make a potential update to the vehicle 102 assigned to the joint rental group 358. The user interface 700 may also include response controls 706 to receive the user confirmation. As one possibility, the user interface 700 may include a yes response control 706-A that, when selected by the user, informs the trip-planning application 170 that the rental group member 360 wishes to review other vehicles 102 that may be available for the ride-share, and a no response control 706-B that, when selected by the user, informs the trip-planning application 170 that the rental group member 360 wishes to forego making an update to the currently allocated vehicle 102.

In some cases, the user interface 700 may visually indicate a default action to be performed when no response is provided via the response controls 706. For instance, the one of the response controls 706 defining the default may be drawn in a style indicative of a default action (e.g., with a dotted line surrounding the option, etc.). In many cases, the default may be to forego making a change in the vehicle 102. Responsive to accepting making a change to the vehicle 102 for the joint rental group 358, the trip-planning application 170 may be configured to display a user interface for selection of vehicles 102, such as the user interface 600 described above.

Figure 8:
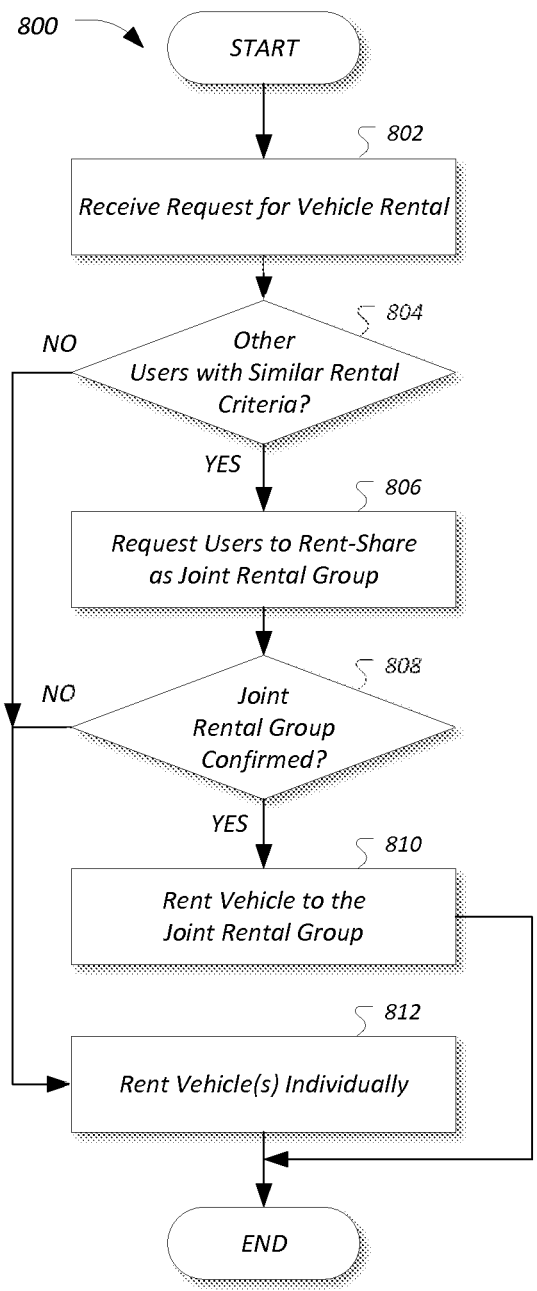
FIG. 8 illustrates an example process for constructing a joint rental group for a vehicle rental.

FIG. 8 illustrates an example process 800 for constructing a joint rental group 358 for a vehicle 102 rental. The process 800 may be performed, in an example, by the ride-sharing server 208 in communication with one or more trip-planning applications 170 installed to user mobile devices 152.

At operation 802, the ride-sharing server 208 receives a request for a vehicle 102 rental. In an example, a user may utilize the trip-planning application 170 to specify characteristics for a requested route 226, such as trip characteristics 304 of the route and passenger characteristics 306 of the user. The user may further indicate a preference to share costs with other users.

At operation 804, the ride-sharing server 208 determines whether other users with similar rental criteria are available to share a rental vehicle 102. In an example, based on multiple requests received from users wishing to share costs (e.g., as received at operation 802), the ride-sharing server 208 may be configured to identify potential joint rental groups 358 of potential rental group members 360 for combined use of a vehicle 102. For instance, the joint rental groups 358 may include a collection of two or more potential rental group members 360 heading to the same or a similar trip destination location 326 with the same or similar timing requires as indicated by the user time constraints 328. The ride-sharing server 208 may further utilize information from the rental server 210 regarding available vehicles 102 to ensure that any identified joint rental group 358 is compatible with available rental vehicles 102 (e.g., the number of users would fit within the vehicle 102, the vehicle 102 characteristics are compatible with the passenger characteristic 306 of the potential rental group members 360, etc.). If compatible users and vehicles 102 are available, control passes to operation 806. Otherwise, control passes to operation 812.

At operation 806, the ride-sharing server 208 requests for users to rent-share a vehicle 102. In an example, the ride-sharing server 208 may send, based on the match of the trip characteristics 304 and vehicle characteristics 302 of the current user to other potential rental group members 360 also requesting a rental, a suggested rental group message to the trip-planning applications 170 of users suggested to be combined into a joint rental group 358. Based on the suggested rental group message, the users may utilize their mobile devices 152 to confirm or reject being a part of the joint rental group 358. An example user interface 500 to receive the confirmation or rejection is discussed above with respect to FIG. 5. Responsive to accepting or rejection inclusion in the upcoming joint rental group 358, the trip-planning application 170 may be configured to send the response to confirm or deny inclusion in the rent-sharing to the ride-sharing server 208 for processing.

At operation 808, the ride-sharing server 208 determines whether the joint rental group 358 is confirmed. In an example, the ride-sharing server 208 may determine that the joint rental group 358 is confirmed when two or more users agree to participate in the joint rental group 358 as rental group members 360. In another example, the ride-sharing server 208 may determine that the joint rental group 358 is confirmed only when all requested users agree to participate in the joint rental group 358 as rental group members 360. If the joint rental group 358 is confirmed, control passes to operation 810. Otherwise, control passes to operation 812.

At operation 810, the ride-sharing server 208 rents a vehicle 102 to the joint rental group 358. In an example, the ride-sharing server 208 may send vehicle 102 information to the trip-planning applications 170 of the mobile devices 152 of the rental group members 360, to indicate available vehicles 102 for rent compatible with the joint rental group 358. In an example, the trip-planning applications 170 may present the user interface 600 to the rental group member 360 users to facilitate the vehicle 102 selection. Further aspects of the rental of the vehicle 102 to the joint rental group 358 are described below with respect to the processes 900, 1000, and 1100. After operation 810, the process 800 ends.

At operation 812, the ride-sharing server 208 rents vehicles 102 to the users individually. Accordingly, the users may rent and use different vehicles 102 at the same time or the same vehicles 102 at different times. In an example, the ride-sharing server 208 may send vehicle 102 information to the trip-planning applications 170 of the mobile devices 152, to indicate available vehicles 102 for individual rent to the users. Similar to as described above, the trip-planning applications 170 may present the user interface 600 to the rental group member 360 users to facilitate the vehicle 102 selection and/or time selection. After operation 812, the process 800 ends.

Figure 9:
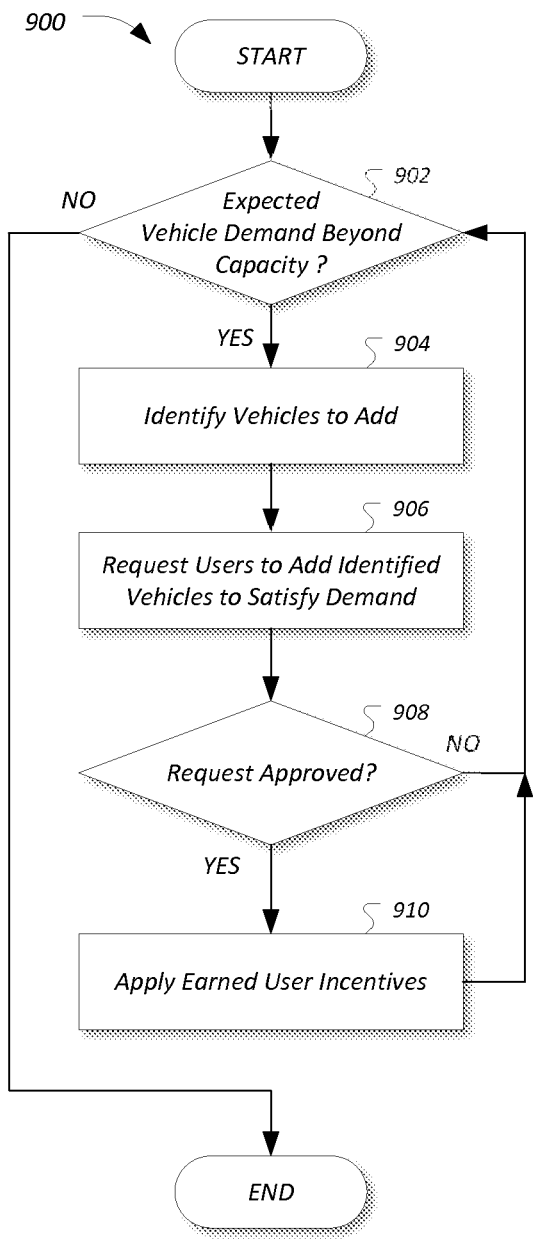
FIG. 9 illustrates an example process for incentivizing users to move vehicles within the vehicle rental area.

FIG. 9 illustrates an example process 900 for incentivizing users to move vehicles 102 within the vehicle 102 rental area. As with the process 800, the process 900 may be performed by the ride-sharing server 208 in communication with one or more trip-planning applications 170 installed to user mobile devices 152.

At operation 902, the ride-sharing server 208 determines whether an expected demand for rental vehicles 102 exists that is beyond current rental vehicle 102 capacity. In an example, the ride-sharing server 208 may receive requests for vehicle 102 rentals within an area (e.g., as received at operation 802), that are in excess of the vehicles 102 that are available for rental in the area according to the rental server 210. If so, control passes to operation 904. Otherwise, the process 900 ends.

At operation 904, the ride-sharing server 208 identified vehicles 102 to add. In an example, the ride-sharing server 208 may identify one or more individually-rented vehicles 102 of users who may be able to perform a rent-share with other users. The determination may be performed, in an example, similar to the determination of other users with similar rental criterial discussed above with respect to operation 804. In another example, the ride-sharing server 208 may identify one or more users whose trip time constraints 328 may accommodate a later departure time, and may request for those users to delay their trips to increase available vehicle 102 capacity.

At operation 906, the ride-sharing server 208 requests rent-share users to add vehicles 102 to satisfy the expected demand. In an example, similar to discussed above with respect to operation 806, the ride-sharing server 208 may send suggested rental group messages to the trip-planning applications 170 of users suggested to be combined into a joint rental group 358. In another example, the ride-sharing server 208 may send delayed travel messages to identified users requesting that they delay the start time of their vehicle 102 rentals. The rental group messages and/or delayed travel messages may further specify incentives to be provided to the users for accepting the combination into the joint rental group 358 and/or delay of travel time. These incentives may include, for instance, a free upgrade to a more premium vehicle 102, a discount off the rental, and a discount off the next rental.

At operation 908, the ride-sharing server 208 determines whether vehicles 102 were approved. In an example, the ride-sharing server 208 may have received user acceptance to the suggestion to combine into a joint rental group 358 or delay their route 226. If one or more acceptances were received control passes to operation 910. Otherwise, control passes to operation 902 to attempt to add additional vehicles 102.

At operation 910, the ride-sharing server 208 applies the earned user incentives. Accordingly, users accepting the suggestion to combine into a joint rental group 358 or delay their route 226 may receive the incentive in order to provide adequate supply of vehicles 102 overall. After operation 910, control passes to operation 902.

Figure 10:
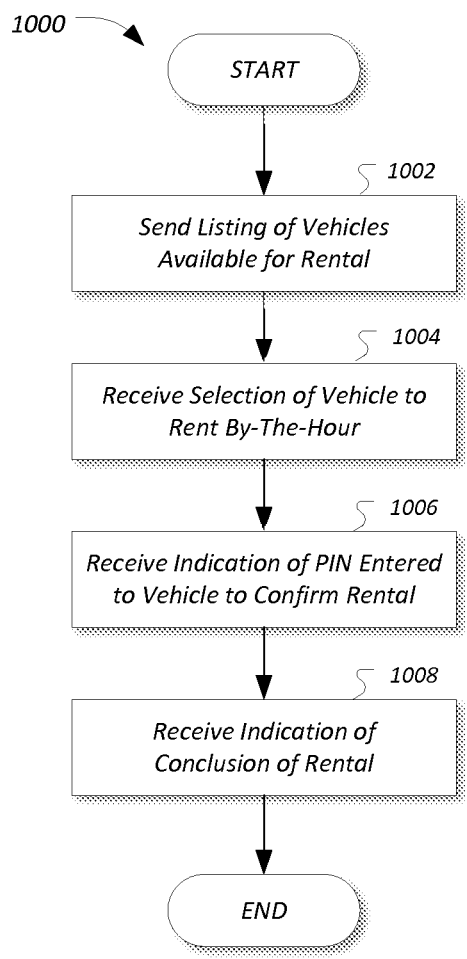
FIG. 10 illustrates an example process for selection of a vehicle to be rented by-the-hour.

FIG. 10 illustrates an example process 1000 for selection of a vehicle 102 to be rented by-the-hour. As with the processes 800 and 900, the process 1000 may be performed by the ride-sharing server 208 in communication with one or more trip-planning applications 170 installed to user mobile devices 152.

At operation 1002, the ride-sharing server 208 sends a listing of vehicles 102 available for rental. In an example, the ride-sharing server 208 may determine a listing of vehicle 102 information to provide to the trip-planning applications 170 of rental group members 360 or individual users. The listing of vehicle 102 may be determined, for instance, according to user-specified constraints (e.g., trip characteristics 304, passenger characteristics 306, etc.) for the rental group members 360 or an individual user, as well as vehicle 102 availability determined from the rental server 210 in accordance with the needs for vehicle 102 size or other characteristics (e.g., luggage capacity, disability accessibility, child's car seat, etc.) of the vehicle 102 to be rented. The listing may be sent, in an example, to a listing of potential users. The user interface 600 may be presented to users, for example, by their respective trip-planning applications 170 responsive to receiving the listing of vehicles 102 to their trip-planning applications 170 from the ride-sharing server 208. The user interface 600 may further include a confirmation identifier 610 received from the ride-sharing server 208 for use in confirming rental of one of the vehicles 102.

At operation 1004, the ride-sharing server 208 receives a selection of one of the listed vehicles 102 to be rented by-the-hour. In an example, responsive to the user selection from the user interface 600, the trip-planning application 170 may be configured to send the selection to the ride-sharing server 208. The ride-sharing server 208 may accordingly note the selection of the vehicle 102.

At operation 1006, the ride-sharing server 208 receives an indication of a confirmation identifier 610 entered to confirm the rental. In an example, the vehicle 102 to be rented may request the user to provide the confirmation identifier 610 to the vehicle 102, such as a rental identification code number, to confirm that the vehicle 102 being picked up is, in fact, being utilized for the joint rental group 358 (or individual user). The vehicle 102 may accordingly send the confirmation identifier 610 to the ride-sharing server 208 to confirm the rental of the vehicle 102. The ride-sharing server 208 may accordingly identify this time as the beginning of the rental.

At operation 1008, the ride-sharing server 208 receives an indication of a conclusion of the rental. In an example, the ride-sharing server 208 may receive an indication from the vehicle 102 that the joint rental group 358 (or individual user) has relinquished control of the vehicle 102. In an example, the vehicle 102 may receive a manual selection from one of the users of the vehicle 102 indicating the conclusion of the rental. In other examples, the vehicle 102 may automatically determine the conclusion, e.g., due to exiting of the vehicle 102 by all occupants, or arrival of the vehicle 102 at a trip destination location 326, as some possibilities. The ride-sharing server 208 may accordingly identify this time to the rental server 210 as the ending of the rental. Accordingly, the rental server 210 may be able to accurately bill the user or users of the joint rental group 358 for the vehicle 102 rental. After operation 1008, the process 1000 ends.

Figure 11:
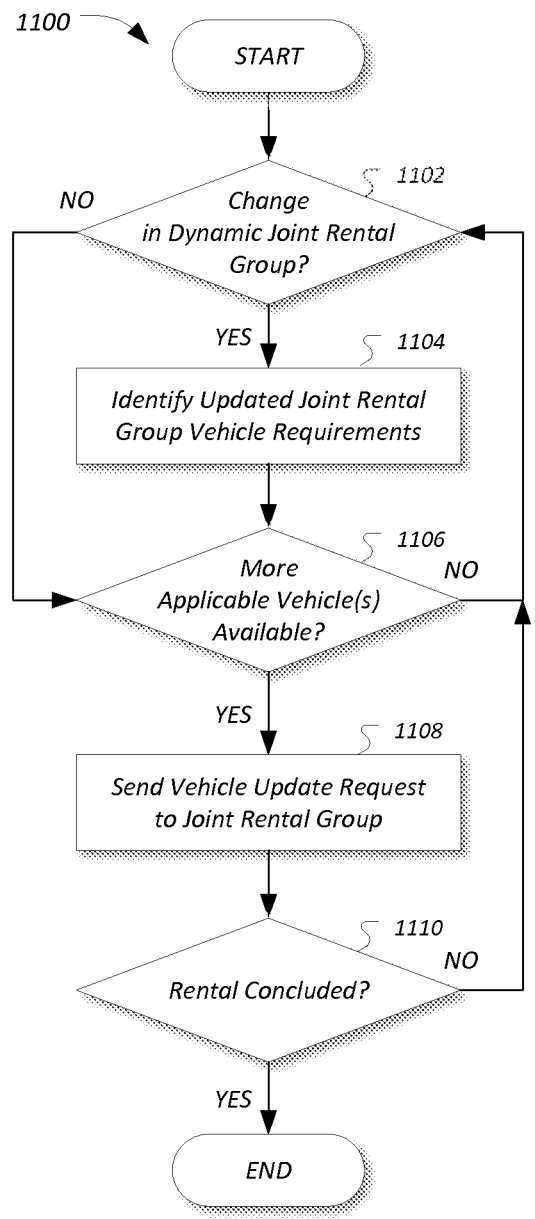
FIG. 11 illustrates an example process for updating a joint rental group to change to an alternate vehicle.

FIG. 11 illustrates an example process 1100 for updating a joint rental group 358 to change to an alternate vehicle 102. As with the processes 800, 900, and 1000, the process 1100 may be performed by the ride-sharing server 208 in communication with one or more trip-planning applications 170 installed to user mobile devices 152.

At operation 1102, the ride-sharing server 208 determines whether there is a change in user composition of a dynamic joint-rental group 358. In an example, one or more rent-sharing group members 360 may leave the rental vehicle 102 (e.g., get off at their stops) or one or more rent-sharing group members 360 may enter the rental vehicle 102 (e.g., get in at their stops). If the users of the dynamic joint-rental group 358 have changed, control passes to operation 1104. Otherwise, control passes to operation 1106.

At operation 1104, the ride-sharing server 208 identified updated joint-rental group 358 vehicle 102 requirements. In an example, based on the change in included rent-sharing group members 360, needs for size or other characteristics of the vehicle 102 to be rented may be changed.

At operation 1106, the ride-sharing server 208 determines whether more applicable vehicles 102 are available for the joint-rental group 358. In an example, the ride-sharing server 208 may query the rental server 210 to identify whether any vehicles 102 are available that are a better match for the characteristics of updated rent-sharing group members 360. As another possibility, the ride-sharing server 208 may query the rental server 210 to determine whether a better matched vehicle 102 is now available for the joint rental group 358 that may have been unavailable when the vehicle 102 was originally rented. This may occur, for example, due to limited vehicle 102 availability when the joint rental group 358 was initiated. For instance, a relatively larger or otherwise mismatched vehicle 102 may have been chosen (e.g., a twelve-passenger van) due to lack of availability of a smaller or otherwise better matched vehicle 102 which may now be available (e.g., a four-door sedan). If a better matched vehicle 102 is available, control passes to operation 1108. Otherwise control passes to operation 1102.

At operation 1108, the ride-sharing server 208 sends a vehicle update request to the joint-rental group 358. In an example, similar to as discussed above with respect to operations 1002, 1004 and 1006 of the process 1000, the ride-sharing server 208 may send a updated listing of vehicles 102 available for rental and potential selection by the ride-sharing group members 360 of the ride-sharing group 358.

At operation 1110, the ride-sharing server 208 determines whether the rental is concluded. In an example, similar to as discussed above with respect to operations 1008 of the process 1000, the ride-sharing server 208 may determine whether an indication of conclusion of the rental has been received. If the rental is concluded, further monitoring of the joint-rental group 358 is not required, and the process 1100 ends. Otherwise, control passes to operation 1102 to continue monitoring of the joint rental group 358.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a ride-sharing server configured to
   receive, from a first user, a vehicle rental request including trip characteristics specifying an origin, a destination, and time constraints;
   identify a second user having rental criteria matching the vehicle rental request;
   send a rent-share request to the first and second users to form a joint rental group;
   rent a vehicle to the joint rental group when the rent-share request is confirmed;
   determine that a better-matched vehicle is now available for the joint rental group that was unavailable when the vehicle was rented; and
   send a vehicle update request to the users of the joint rental group indicating that the better-matched vehicle is now available.

2. The system of claim 1, wherein the rental criteria further includes passenger characteristics of the user, and wherein the ride-sharing server is further configured to identify the vehicle as matching the passenger characteristics of the user and passenger characteristics of the other user.

3. The system of claim 1, wherein the ride-sharing server is further configured to:
   include, in the request, a confirmation identifier for use in confirming rental of the vehicle; and
   confirm the vehicle as rented responsive to receipt of the confirmation identifier from the vehicle.

4. The system of claim 3, wherein the ride-sharing server is further configured to indicate, to a rental server, an indication of a start time of rental of the vehicle responsive to the receipt of the confirmation identifier.

5. The system of claim 4, wherein the ride-sharing server is further configured to indicate, to the rental server, an indication of a rental end time for the vehicle responsive to the receipt of an indication from the vehicle that the rent-share is completed.

6. The system of claim 1, wherein the ride-sharing server is further configured to determine that the better-matched vehicle is now available responsive to one or more of an addition of a rent-sharing group member to the joint rental group and a removal of a rent-sharing group member from the joint rental group.

7. The system of claim 1, wherein the ride-sharing server is further configured to indicate, in the vehicle update request, an incentive to be applied to at least one rent-sharing group member of the joint rental group responsive to accepting the better-matched vehicle for the rent-sharing in exchange for the vehicle.

8. The system of claim 7, wherein the incentive includes one or more of a free upgrade to a premium vehicle, a discounted cost of the rent-share, and a discounted cost of a future rent-share.

9. A computer-implemented method comprising:
identifying a vehicle matching passenger characteristics of first and second users having matching rental criteria;
sending a rent-share request including a confirmation identifier to the first and second users to rent-share as a joint rental group using the vehicle;
renting the vehicle to the joint-rental group when the rent-share request is confirmed by receipt of the confirmation identifier from the vehicle;
determining that a better-matched vehicle is now available for the joint rental group that was unavailable when the vehicle was rented; and
sending a vehicle update request to the users of the joint rental group indicating that the better-matched vehicle is now available.

10. The method of claim 9, further comprising determining whether the better-matched vehicle is now available responsive to one or more of an addition of a rent-sharing group member to the joint rental group and a removal of a rent-sharing group member from the joint-rental group.

11. The method of claim 9, further comprising indicating, in the vehicle update request, an incentive to be applied to at least one rent-sharing group member of the joint rental group responsive to accepting the better-matched vehicle for the rent-sharing in exchange for the vehicle.

12. The method of claim 11, wherein the incentive includes one or more of a free upgrade to a premium vehicle, a discounted cost of the rent-share, and a discounted cost of a future rent-share.

13. A system comprising:
a mobile device of a ride-sharing user configured to
send, to a rent-sharing server, a vehicle rental request including trip characteristics specifying an origin, a destination, and time constraints;
receive, from the rent-sharing server, a rent-share request for a vehicle as a joint rental group including another user having rental criteria matching that of the vehicle rental request;
responsive to the rent-share request, rent the vehicle as the joint rental group;
display a user interface indicating the vehicle update request;
responsive to receiving assent to switch to an available vehicle that is a better fit to a joint rental group that a current vehicle rented to the ride-share user, display a listing of the available vehicles and a confirmation identifier; and
receive a selection from the listing of the available vehicles to be confirmed by entry of the confirmation identifier into the vehicle as selected from the listing.

14. The system of claim 13, wherein the rent-share request includes a confirmation identifier for use in confirming rental of the vehicle, and the mobile device is further configured to display the confirmation identifier in a user interface of the mobile device to allow the user to enter the confirmation identifier into the vehicle to confirm the vehicle as rented to the joint rental group.

15. The system of claim 13, wherein the mobile device is further configured to
send, to the rent-sharing server, an indication of one or more of an addition of a rent-sharing group member to the joint rental group and a removal of a rent-sharing group member from the joint rental group; and
receive, responsive to the indication, a vehicle update request to the users of the joint rental group indicating that a vehicle better matched to the joint rental group, as updated, is now available.

16. The system of claim 15, wherein the mobile device is further configured to receive, in the vehicle update request, an incentive to be applied to at least one rent-sharing group member of the joint rental group responsive to accepting the vehicle better matched to the joint rental group in exchange for the vehicle.

17. The system of claim 16, wherein the incentive includes one or more of a free upgrade to a premium vehicle, a discounted cost of the rent-share, and a discounted cost of a future rent-share.

* * * * *